United States Patent [19]

Becker et al.

[11] 4,397,030
[45] Aug. 2, 1983

[54] DIGITAL COMMUNICATION SYSTEM

[75] Inventors: Dietrich Becker, Leonberg; Firoz Kaderali, Renningen; Roland Liebscher, Korntal, all of Fed. Rep. of Germany

[73] Assignee: International Standard Electric Corporation, New York, N.Y.

[21] Appl. No.: 244,368

[22] Filed: Mar. 16, 1981

[30] Foreign Application Priority Data

Mar. 20, 1980 [DE] Fed. Rep. of Germany ....... 3010702

[51] Int. Cl.³ .............................................. H04J 3/08
[52] U.S. Cl. ...................................... 375/36; 370/24; 370/62; 370/100; 375/106
[58] Field of Search ................ 179/16 R, 16 A, 16 C, 179/18 B; 370/24, 29, 32, 58, 62, 110.1, 111, 100; 375/36, 106

[56] References Cited

U.S. PATENT DOCUMENTS

| 3,924,077 | 12/1975 | Blakeslee | 370/29 |
| 4,171,467 | 10/1979 | Evenchik | 370/111 |
| 4,205,201 | 5/1980 | Kahn | 370/110.1 |
| 4,287,588 | 9/1981 | Segner | 370/29 |

Primary Examiner—Benedict V. Safourek
Attorney, Agent, or Firm—James B. Raden; Marvin M. Chaban

[57] ABSTRACT

A digital subscriber terminal equipment is connected to the line circuit at a local exchange via a conventional subscriber line but permits simultaneous transmission of speech and data (e.g., viewdata). The terminal equipment and the line circuit each contain a central unit, a direction-separating unit, and a 10-bit data bus; the terminal equipment also includes a codec with a filter. The central units control the writing and reading of the digital signals into and out of the data bus and form on the subscriber line a main channel for data or speech, an additional channel for control, and an additional data channel.

5 Claims, 10 Drawing Figures

| BIT NO.<br>WORD NO. | 1 | 2 | 3 | 4 | 5 | 6 | 7 | 8 | 9 | 10 |
|---|---|---|---|---|---|---|---|---|---|---|
| 1<br>⋮<br>8 | | | | SPEECH<br>OR<br>DATA | | | | | SYNCHR. | DATA |
| 9<br>⋮<br>16 | | | | | | | | | SIGNALLING | |
| 17<br>⋮<br>24 | | | | | | | | | | |
| 25<br>⋮<br>32 | | | | | | | | | | |

DIGITAL COMMUNICATION SYSTEM

The present invention relates to a digital communication system as set forth in the preamble of claim 1.

A system of this kind is known (DE-OS No. 27 58 109) in which different speech and data channels in a telephone network are transmitted over a two-wire subscriber line between the subscriber terminal equipment and the line circuit at the associated exchange using time-division multiplexing. The transmission takes place at a speed (or bit rate) of 192 kbits/s.

If longer distances between the exchange and the subscriber are to be covered in the known system, it is necessary to either lay special subscriber lines or use regenerative repeaters in order to ensure the necessary quality of transmission. The laying of new lines and the use of repeaters involve considerable capital outlay.

The object of the invention is to provide a digital communication system which permits speech and data to be simultaneously transmitted in perfect quality over conventional telephone subscriber lines.

According to the invention, this object is attained by the communication system characterized in claim 1.

Advantageous aspects of the invention are characterized in the subclaims.

One advantage of the invention is that synchronizing and signalling information as well as data can be simultaneously transmitted over an additional channel on the same line at a low bit rate. In addition, in the system according to the invention, the bit error rate, i.e., the probability that a bit is received incorrectly, is very small. The main channel can be used to transmit either speech or data, and the additional channel can be used to transmit data simultaneously and independently of the main channel.

An embodiment of the invention will now be explained with reference to the accompanying drawings, in which.

Figure 1:
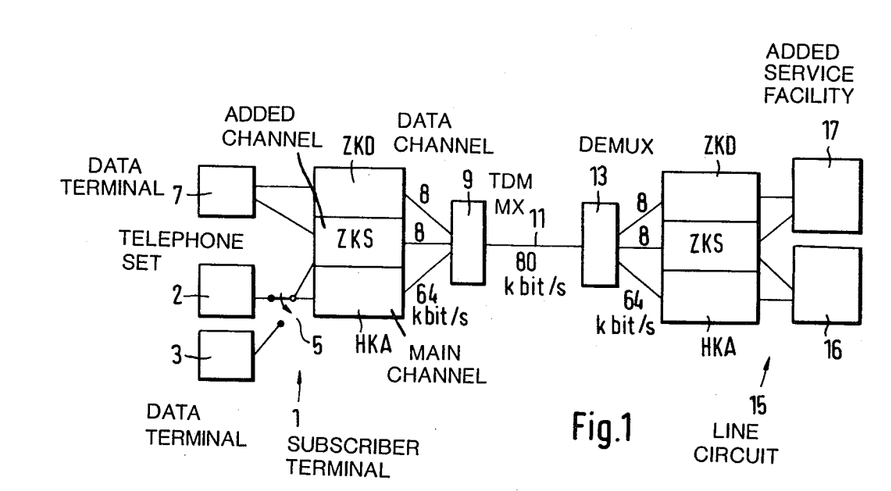
FIG. 1 shows schematically the time-division multiplex channels formed in the communication system according to the invention.

The subscriber terminal equipment 1 of a digital communication system according to the invention contains a telephone set 2, in which the analog speech signals are digitized by a suitable method—for example, by pulse-code modulation (PCM)—, and in which the digital signals are gated into a main channel HKA. The digital signalling and synchronizing information required to set up and operate a communication link are gated into an additional channel ZKS for signalling and synchronization. The terminal equipment may also be provided with a data terminal 3 of any kind, which, as indicated by a switch 5, can be connected to the communication system, and whose digital intelligence signals are then transmitted over the main channel HKA in place of the speech signals, while the signalling and synchronizing information is also entered into or read from the additional channel ZKS.

The terminal equipment may include an additional data terminal 7, which delivers digital data signals at a low bit rate. The bit stream is gated into an additional data channel ZKD, while the signalling bits are entered into the additional signalling channel. While speech and data can be transmitted over the main channel HKA only separately, additional data transmission can take place over the additional channel simultaneously and independently of the transmission over the main channel.

In the embodiment shown, the gross bit rate of the main channel HKA is 64 kbits/s, that of the additional channel ZKS for signalling and synchronization is 8 kbits/s, and that of the additional data channel ZKD is also 8 kbits/s.

The different bit streams are interleaved in time in a time-division multiplexing circuit 9 and transmitted as an 80-kbit/s stream over a subscriber line 11 to a demultiplexing circuit 13 at the exchange, in which the bit streams of the main channel HKA, the additional channel ZKS for signalling and synchronization, and the addition channel ZKD for data are separated again. During data transmission in the opposite direction, i.e., from the exchange to the terminal equipment, the circuit 13 is used as a multiplexer, while the circuit 9 acts as a demultiplexer, i.e., separates the bit streams.

Figure 6:
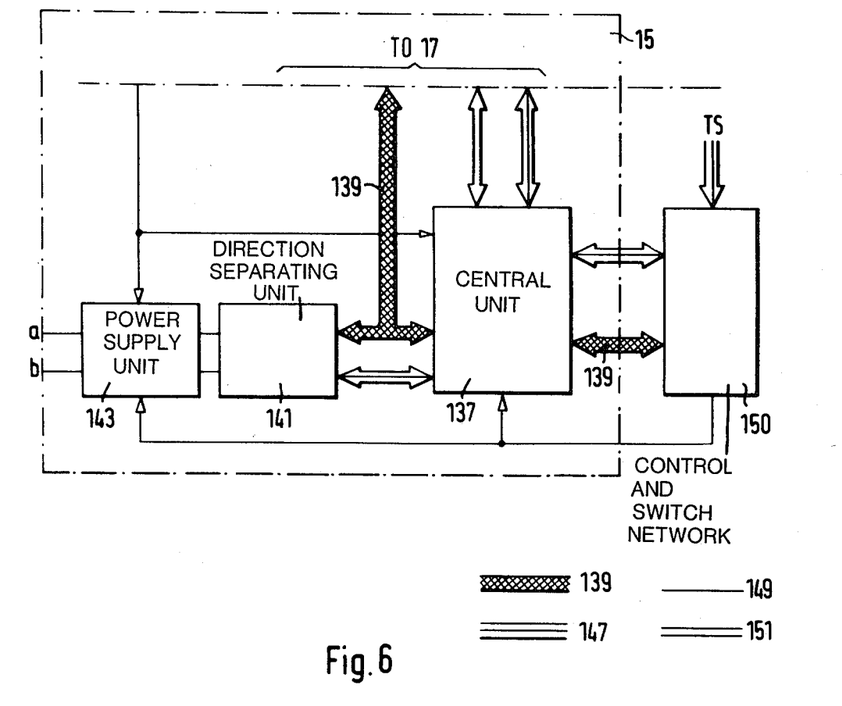
FIG. 6 is a block diagram of the line circuit at the exchange.

The subscriber line 11 and hence the terminal equipment 1 is connected via a subscriber line circuit 15 to the associated exchange (not shown), and via the exchange to the remainder of the telephone network. From the terminal equipment 1 the information and control signals are transmitted over the main channel KHA and the signalling and synchronizing channel ZKS to the line circuit 15. The basic design of the latter is shown in FIG. 6. It may be provided with an additional service facility 17, which establishes the connection to a data network, such as the integrated data network IDN or the datapacket switching network. The exchange of data between the data terminal 7 and the additional service facility 17 takes place over the additional data channel ZKD, signalling and synchronization being effected over the additional channel ZKS.

The additional service facility also serves to establish connections to the local viewdata center. Communication with the viewdata center can take place over the additional channel ZKD while a long-distance call is in progress on the main channel HKA. Unlike in the conventional analog local network, a viewdata call does not block the telephone line. In addition, there is sufficient capacity for the transmission of signalling information for further services and service features to be implemented in future.

Figure 2:
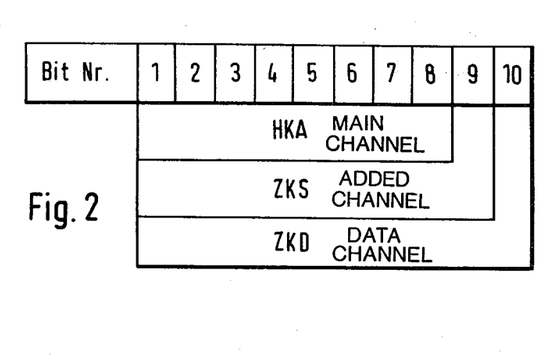
FIG. 2 shows the assignment of the numbers of the bits transmitted over the subscriber line to the individual channels of FIG. 1.

FIG. 2 shows an advantageous word structure of the digital signals transmitted over the subscriber line 11, i.e., the assignment of the individual bit numbers to the different channels. The bits number 1 to number 8 of each word are assigned to the main channel HKA, the bit number 9 is assigned to the additional channel ZKS for signalling and synchronization, and the bit number 10 is assigned to the additional data channel ZKD. The word duration is 125 μs, and the word repetition rate is 8 kHz.

Figure 3:
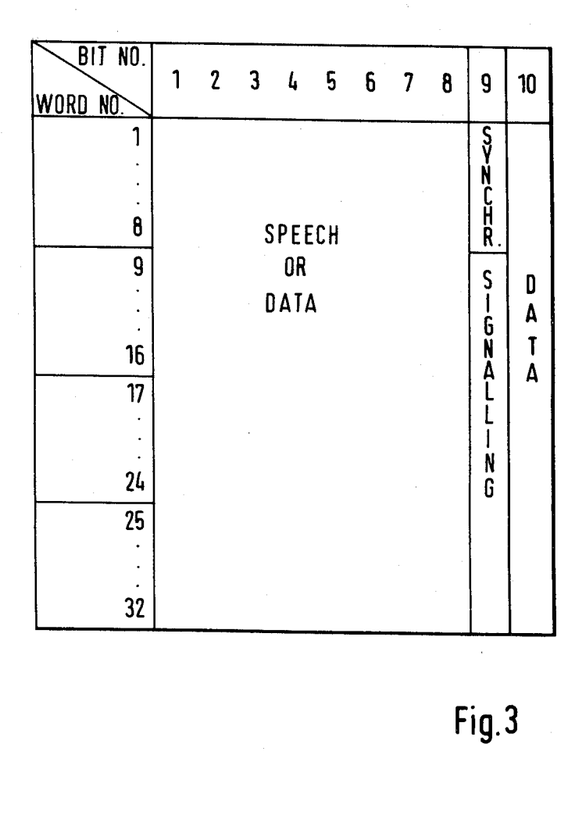
FIG. 3 shows the structure of the time-division multiplex frame used in the communication system according to the invention.

While the bit numbers within a word identify the channels, the frame structure shown in FIG. 3 serves to resolve the bit sequence in the transmission channel into words. A frame contains 32 10-bit words, so the frame length is 320 bits.

The frame period is 4 ms. At a word repetition rate of 8 kHz, this results in a frame repetition rate of 250 Hz.

As can also be seen from FIG. 3, the bit number 9 of the words number 1 to number 8 of a frame is used for frame synchronization, while the bit number 9 of the words number 9 to number 32 of a frame are used for signalling.

Signalling information formed from the aforementioned bits serves for network control, i.e., for the exchange of signals with the switching equipment and for the exchange of information with specialservice facilities and additional services.

Unlike in the conventional analog local network, where states are usually signalled, in the communication system according to the invention, events, i.e., changes of state, are signalled. The signalling information is transmitted over the additional channel ZKS, i.e., outside the voice band. Audible tones are the only exception. A signalling word is divided into the following three fields of 8 bits each (octets): a header, an information field, and a check field.

The subscriber terminal equipment 1 (FIG. 4) includes the telephone set 2 with the following basic functions: a speech network with a receiver 21 and a transmitter 23, a switchhook 25, a dialling device 27 with 16 push buttons, a 16-digit numeric display 29, and a ring-tone generator 31.

The speech network 20 (see FIG. 5) contains a handset (not shown) equipped with the dynamic receiver 21 and the dynamic transmitter 23, and a matching circuit 33, which represents the interface to a conversion unit 35. The matching circuit 33 causes the transmission values required by the telephone administration, such as reference equivalent, sidetone reduction, frequency response, etc., and the transfer level at the interface to be maintained.

Figure 5:
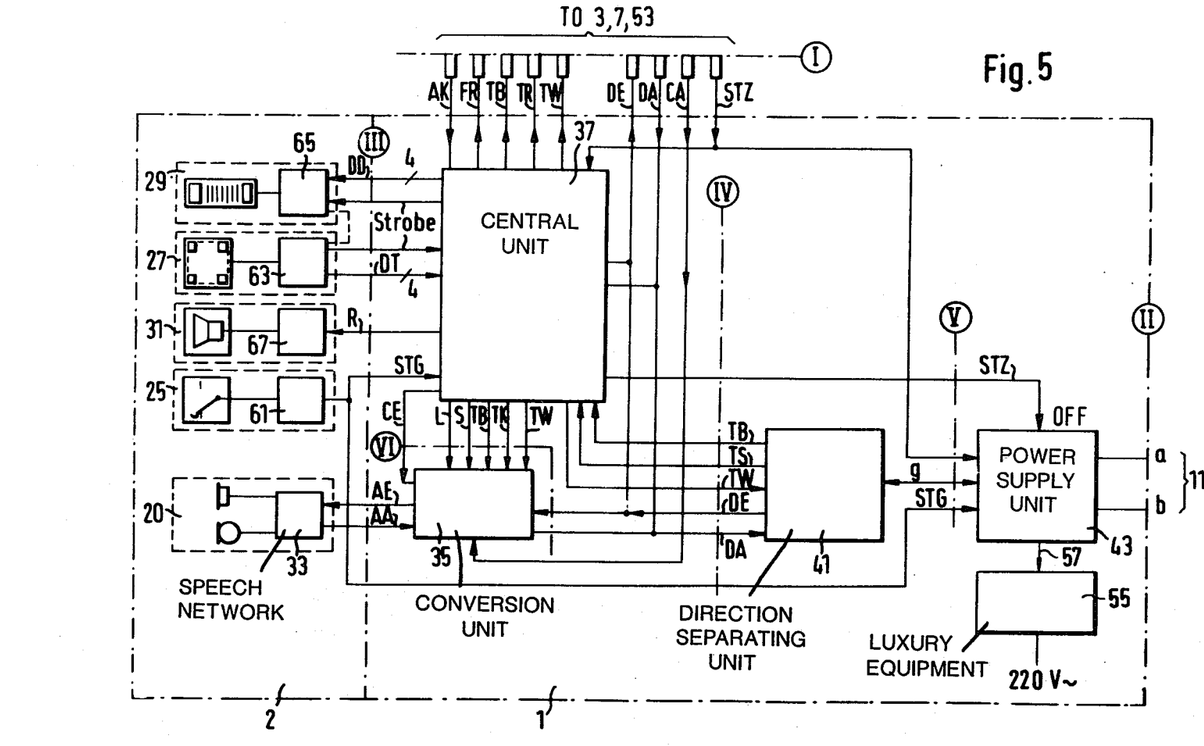
FIG. 5 shows the terminal equipment of FIG. 4 with the individual data and control lines.

The switchhook 25 signals the subscriber status by turning the power supply on and off and thus initiates the synchronization phase in the digital line circuit.

The conversion unit 35 contains a codec (encoderdecoder), a filter, and a buffer memory. The speech picked up by the microphone 23 is band-limited by the low-pass filter, digitized, and coded into 8-bit words in accordance with a CCITT recommendation. The coded words are called up at the correct time by a central unit 37 at the subscriber's end and gated into the outgoing line of a serial data bus 39, hereinafter also referred to as "10-bit bus".

In the receive direction, the 8-bit words are gated out of the 10-bit channel and written into the buffer memory of the conversion unit 35 under the control of a clock from the central unit 37. There the 8-bit PCM words are the available for continuous digital-to-analog (D/A) conversion. The analog signal is then voice-band-limited and applied to the receiver 21. In the rest condition and in the ringing condition, the conversion unit 35 is disconnected from the power supply.

Besides performing the functions mentioned above, when the handset is taken off the hook, the switchhook 25 disconnects a call receiving circuit in the central unit 37 and simultaneously turns on the speech network 20 and the conversion unit 35, which contains the codec; when the handset is replaced, the speech network 20 and the conversion unit 35 are turned off.

The dialling service 27 has, in addition to the usual push buttons 1 to 0 for entering the call numbers directly into the central unit 37, a button for charge indication, a button for time display, and four additional buttons for special functions.

The numeric display 29 is a 16-digit display with a suitable drive circuit. The display is driven with coded signalling words which are evaluated in the central unit 37. The display may show, for example, the time, the charge, the dialled number or the number of the calling subscriber.

Figure 4:
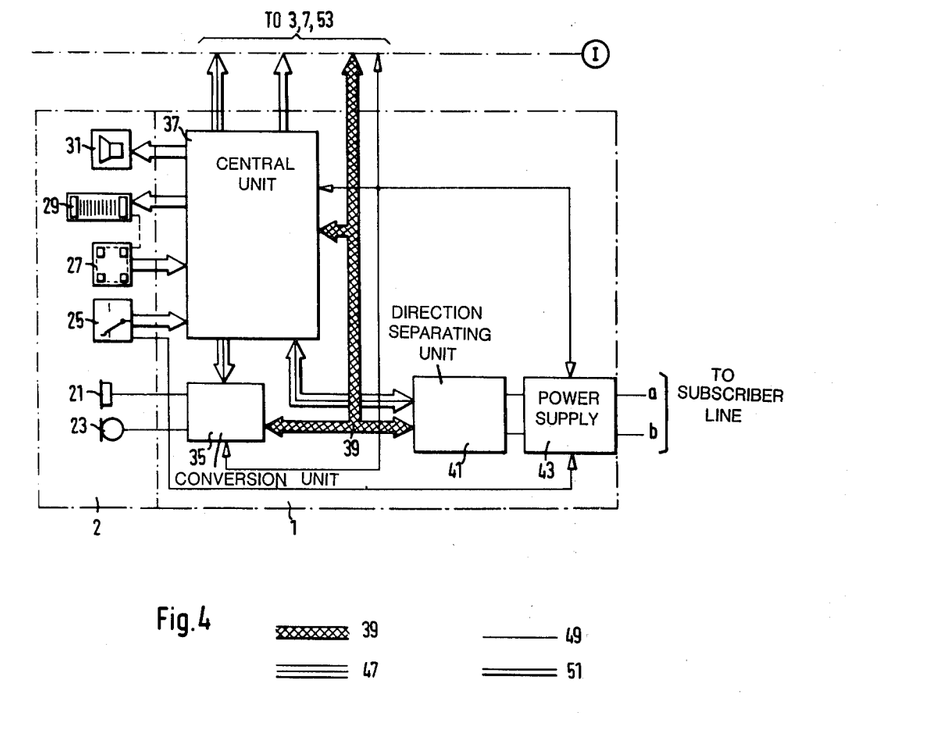
FIG. 4 is a block diagram of the subscriber terminal equipment of the communication system according to the invention.

The subscriber terminal equipment 1 includes a direction-separating unit 41 and a power supply unit 43 provided with a seizure detection circuit. In the rest condition, the circuits of the terminal equipment are currentless, i.e., the power supply is off. The power supply is turned on by the seizure detection circuit (a so-called bit-stream detector). This circuit, which requires very little power in the rest condition, turns on the power supply in the event of a seizure, the turning on being initiated by the bit stream transmitted by the exchange, or by the actuation of the switchhook upon removal of the handset, or by the turning on of an additional facility connected to the digital terminal equipment.

Figure 8:
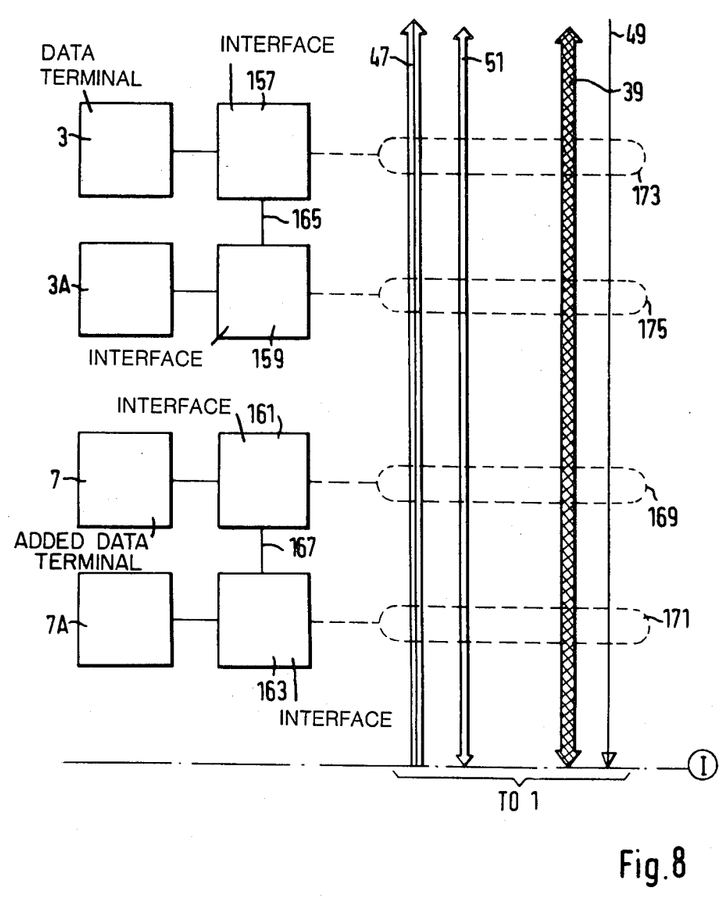
FIG. 8 shows schematically additional facilities connectable to the terminal equipment for data transmission over the main channel and for data transmission over the additional channel.

The tasks of the central unit 37 in the terminal equipment 1 are: synchronizing the subscriber terminal equipment 1, receiving and transmitting signalling information, controlling the conversion unit 35 and particularly the codec therein, and controlling the additional facilities 3, 7, to which only the interface is shown in FIG. 4 (see also FIG. 8).

Details of the seizure detection and the power supply unit 43 are disclosed in German Patent Application No. P 29 40 617.5.

The central unit 37 and the other circuits of the subscriber terminal equipment, including the telephone set 2, are interconnected by a data bus 39, control lines 47, on/off lines 49, and priority lines 51, which are distinguishable by their different graphic representations (see FIG. 4 below).

The ring-tone generator 31 operates on direct current. After the remotely controlled power-supply and seizure-detection unit 43 has been activated, the ring-tone generator 31 is turned on and off by means of a ring control signal transmitted over the signalling channel ZKS and decoded in the central unit 37.

The terminal equipment 1 is prepared for modular extension. This is achieved, among other things, by designing the data channel 39 as a serial 10-bit bus. At an interface I, formed by the data bus and by control and signalling lines, an additional facilities 3, 7 and an add-on unit or luxury equipment 53 with additional features can be added to the subscriber terminal equipment, as mentioned above. Examples of luxury features are an extended alphanumeric keyboard, an alphanumeric display, and a special keyboard (not shown).

The individual lines at the various interfaces are apparent from FIG. 5, where the units of the terminal equipment are designated by the same reference characters as in FIG. 4. Unlike the basic equipment, which is remotely supplied from the exchange, the additional facilities 3, 7 and the luxury equipment 53 are powered locally from the 220-V line.

At the interface to the additional facilities 3, 7 and luxury equipment 53, the following lines are provided: active (for signalling from the additional facilities), AK, release (for signalling from the additional facilities, FR, bit-rate clock, TB, frame-rate clock, TR, word-rate clock, TW, incoming data (in the binary code), DE, outgoing data (in the binary code), DA, disconnection of the codec, CA, and power supply on/off, STZ.

At the interface II, in the case of a balanced two-wire line as is shown in FIG. 5, the a- and b-wires of the subscriber line 11 are present. In the case of a balanced four-wire line as may be used if the subscriber and the exchange are separated by a great distance, the interface is formed by the c-, d-, e-, and f-wires of the subscriber line 11.

The interface 111 between the telephone set and the remainder of the terminal equipment 1 contains the following lines: analog input, AE, analog output, AA, power supply on/off (from the switchhook), STG, start/stop for tone ringing, R, a four-wire line DT for the data input from the keyboard 27, a control line labelled "Strobe" from the keyboard 27, a four-wire data line DD, and a control line labelled "Strobe" to the numeric display 29.

The interface IV contains the following lines: bit-rate clock TB, system clock TS, word-rate clock TW, incoming binary-coded data, DE, and outgoing binary-coded data, DA.

The interface V contains the following lines: unbalanced connecting line g, on which the data are present in the line code; power supply on/off from the additional facilities, STZ, and from the central unit 37, STZ, power supply on/off from the switchhook, STG. In the case of a four-wire line, this interface contains in place of the line g an unbalanced line i for incoming data in the line code, and an unbalanced line j for outgoing data in the line code.

The interface VI contains the following lines: codec on, CE, read (PCM word), L, write (PCM word), S, bit-rate clock, TB, converter clock,(e.g., 128 kHz), TK, and word-rate clock, TW.

The operation of the terminal equipment 1 shown in FIGS. 4 and 5 will now be explained in detail. The operating current required for the basic terminal equipment is coupled out between the a-wire and the b-wire of the subscriber line by means of a coupling transformer contained in the power supply unit 43, a constant operating voltage being adjusted by a shunt regulator.

As mentioned above, the power supply unit 43 contains a seizure detector which detects a bit stream on the subscriber line 11. This seizure detector is a receiver with a high-impedance input and a response threshold. It draws the necessary low closed-circuit current from the coupling device, which is still unloaded in this condition, the shunt regulator being not effective.

In the rest condition, no current flows through the subscriber line 11 except for the low closed-circuit direct current for the seizure detector. The power supply for all other units is off. It can be turned on by the subscriber, the additional facilities 3, 7, or the bit-stream detector (interface lines STG and STZ).

The coupling transformer of the power supply unit 43 provides the necessary potential separation and signal level adaptation between the subscriber line 11 and the subscriber terminal equipment. Within the terminal equipment 1, the transmission path is unbalanced (interface line g in FIG. 5).

The terminal equipment 1 is protected against any overvoltages occurring on the subscriber line 11 by a protective device in the power supply unit 43.

The power supply unit for a four-wire line differs from the above-described power supply unit 43 in that the current is coupled out of the c-, d-wires and the e-, f-wires via two coupling transformers, and that the bit-stream detector monitors the bit stream on the c- and d-wires.

The direction-separating unit 41 may be designed either for a two-wire line, in which case it operates in time- or frequency-division multiplex or single-frequency duplex mode, or for a four-wire line, on which both directions of transmission are separated in space.

Line coding is also performed in the direction-separating unit 41. The incoming bit-rate clock required for line coding is derived by bit synchronization and is also available to the central unit 37. The outgoing bit-rate clock is provided by the central unit 37.

In the case of a two-wire line, the directions of transmission are separated by the following techniques. With respect to the interface V (FIG. 5), one must distinguish three types of direction-separating techniques: time-division multiplex, single-frequency duplex, and two-frequency duplex. In the first type, the signals are present in bursts; in the other two types, they are present in continuous form.

The direction-separating unit 41 is connected to the subscriber line 11 via the interface line g and the transformer contained in the power supply unit 43. In addition to the actual separating device, it contains line coders and decoders as well as line drivers and receivers with the necessary pulse-shaping or equalizing devices.

The bit-rate clock required in the terminal equipment 1 is derived in the direction-separating unit 41 from the bit stream arriving over the subscriber line, and is made available to the central unit 37 via the interface line TB.

The incoming data extracted from the subscriber line 11 are so conditioned in the direction-separating unit 41 as to be available on the interface line DE in binary form and synchronously and in phase with the incoming bit-rate clock TB. The system clock is also applied from the direction-separating unit 41 to the central unit 37. Via the line TW, the outgoing word-rate clock is made available in continuous form to the central unit 37.

In the terminal equipment 1 or in the additionl facilities 3, 7, the insertion of outgoing data into th 10-bit channel is controlled by the central unit in such a way that the data are available on the interface line DA synchronously and in phase with the bit-rate clock.

If communication takes place over a four-wire line, the direction-separating unit 41 operates on a space-division multiplex basis. It differs from the direction-separating unit for the two-wire line in that a continuous data stream is present at the interface at all times.

The codec and filters in the conversion unit 35, which perform the analog-to-digital and digital-to-analog conversion of the speech signals, are connected to the transmitter and receiver of the speech network 20 on the analog side, and to the 10-bit channel on the digital side.

The central unit 37 provides the clocks required to operate the codec and to write and read the 8-bit PCM words into and from the 10-bit data bus 39 (FIG. 4): the bit-rate clock TB, the converter clock TK, and the word-rate clock TW.

Th conversion unit 35 has control inputs CE ("converter on") and CA ("converter off"). The turning on and off of the conversion unit 35 is necessary in order to reduce power consumption in the on-hook condition, so that sufficient ringing current is available, and during data transmission over the main channel.

In addition, write and read pulses are generated for the codec of the conversion unit 35. These two pulses cause the 8-bit PCM word to be, respectively, written into and read from the 10-bit data stream at the correct time. The interface line L is activated during the first 8 bit periods of each 10-bit word appearing on the interface line DE.

In the case of the outgoing data, the 8-bit PCM words are gated into the outgoing 10-bit data bus, i.e., the interface line DA, in the first 8 bit periods of each word. The write instruction coming from the central unit 37 marks the positions of the 8-bit PCM words in the outgoing PCM channel. The interface line S is activated during the first 8 bit periods of each 10-bit word on the interface line DA.

On the interface line AE, which runs to the matching circuit or interface device 33 of the speech network 20, the incoming signal is available in analog form with a defined level. On the interface line AA, which comes from the interface device 33, the outgoing signal is available in analog form with a defined level.

The digital-to-analog and analog-to-digital conversion in the conversion unit 35 is performed according to the A-law of CCITT recommendation G 711. The transmission characteristics conform the CCITT recommendation G 712.

The central unit 37 contains a synchronizing device for deriving the frame-rate clock from the bit-rate clock coming from the direction-separating unit 41. In addition, it includes a multiplex control for inserting information from the main channel HKA and the additional channels ZKS, ZKD into the 10-bit data bus 39 and extracting it therefrom. It provides the necessary write and read clocks to the codec and includes devices for adapting the signalling between the units of the basic equipment—switchhook 25, dialling device 27, numeric display 29, and ring-tone generator 31—and the additional channel ZKS. The units 25, 27, 29, and 31 are connected to the central unit 37 via interface devices or matching circuits 61, 63, 65, and 67, respectively.

If the terminal equipment 1 is provided with additional facilities, the bit-rate clock, the word-rate clock, and the frame-rate clock are made available by the central unit 37 to the interface I of the additional facilities 3, 7 via the lines TB, TW, and TR, respectively. Two further signals, transferred over the interface lines FR and AK, control the priority between the telephone set 2 and the additional facilities 3, 7. In the outgoing direction, signalling information from the telephone set has priority over that from the additional facilities, but a transmission started for the additional facilities is completed in any case. The central unit 37 controls all time sequences between the data bus 39 (interface IV), the conversion unit 35 (interface VI), the signalling devices of the telephone set 2 (interface III), and the additional facility 3 or 7 (interface I).

In the central unit 37, an 8-bit synchronizing word is selected from every ninth bit of the incoming data DE with the aid of the incoming bit-rate clock TB. The synchronizing word is inserted into the outgoing data stream DA in the ninth bit of the first eight word periods of each frame period (cf. FIG. 3).

During the seizure phase, the synchronization is supported by gating a bit pattern into those bits of the outgoing data stream which are not used for the synchronizing word. The gating is interrupted as soon as the request to seize has been detected. During the synchronization time, the incoming data stream, too, is provided with a pattern supporting the synchronization. This pattern is designed to speed up the synchronization.

Synchronization is considered achieved if the synchronizing word was detected twice in succession. If the synchronizing word was not detected twice in succession, the synchronization will be initiated anew. After synchronization has been achieved, the central unit 37 provides the bit-rate clock TB, the frame-rate clock TR, and the word-rate clock TW, which is derived from the frame-rate clock. The bit-rate clock is delivered in continuous form.

Bit, word, and frame periods begin at the same time. A frame period is 32 word periods and 320 bit periods long.

After synchronization has been achieved, a continuous check is made to determine whether the code for telephone communication is contained in the header of a frame period of the incoming data stream DE. If the request-to-seize signal is detected in the information field together with the header for telephone communication, first the gating of the synchronization-supporting bit pattern into the outgoing data stream will be interrupted, and then the condition of the switchhook will be continuously checked. Thus, starting from the rest condition, each change of the switchhook from "on-hook" to "off-hook" is gate in the form of the seizure signal into the outgoing data stream, and each change of the switchhook from "off-hook" to "on-hook" is gated into the outgoing data stream in the form of the clear signal, in the information field of a frame period, with the header containing the code for telephone communication. The seventh bit of the header serves for information-field identification: "0" for control signal, "1" for a symbol from an internationally standardized alphabet (I.A. No. 5).

To control the code of the conversion unit 35, the central unit 37 generates a read pulse L, through which the codec is informed when an 8-bit PCM word is available on the data bus 39, or a write pulse S, through which the codec is informed when an 8-bit word is to be gated into the data bus 39.

To alert the subscriber to an incoming call, a memory at an output R to the ringing device is set if, together with the header for telephone communication, the character for "connection of ringing tone" is detected in the formation field of a frame period of the incoming data stream DE. If the character for "ring tripping" is detected in the same manner, the memory will be reset.

The numeric display 29 is controlled as follows. If, together with the header for telephone communication, the internationally standardized character is detected in the information field of a frame period of the incoming data stream DE, the last four bits are transferred in parallel form over the control line DD to the display 29 together with a read pulse (strobe).

Dialling is performed as follows. If the central unit 37 is selected by the push buttons of the dialling device 27 via the four interface lines DT, the push-button codes received by the central unit 37 are converted into corresponding binary-coded characters. The binary-coded characters, together with the character for "telephone communication" in the header, are gated into the outgoing data stream in the fourth to seventh bits of the information field of a frame period. The first three bits of the information field are assigned the bit sequence "110".

During signalling, parity checks with acknowledgement are performed. If more stringent requirements must be met, an error detecting code character can be gated into the check field of each frame period of the out-going data stream. This code character is then checked and acknowledged at the receiving end.

At the interface I to the additional facility 3 or 7, the bit-rate clock, the word-rate clock, and the frame-rate clock are made availble (lines TB, TW, and TR), as mentioned above. To ensure that signals are processed according to priority, the interface line FR is deactivated as soon as a seizure or clear signal coming from the switchhook 25 or a dial signal coming from the dialling device 27 is available for transmission over the data bus 39. The signal transmission is delayed until the interface line AK is activated by the additional facility. This ensures that the transmission of any signal already started by the additional facility will be completed.

The interface line FR also serves to inform the respective additional facility 3 or 7 of the condition of the subscriber terminal equipment. It can be activated only if synchronism exists and if a request-to-seize signal was received.

Figure 7:
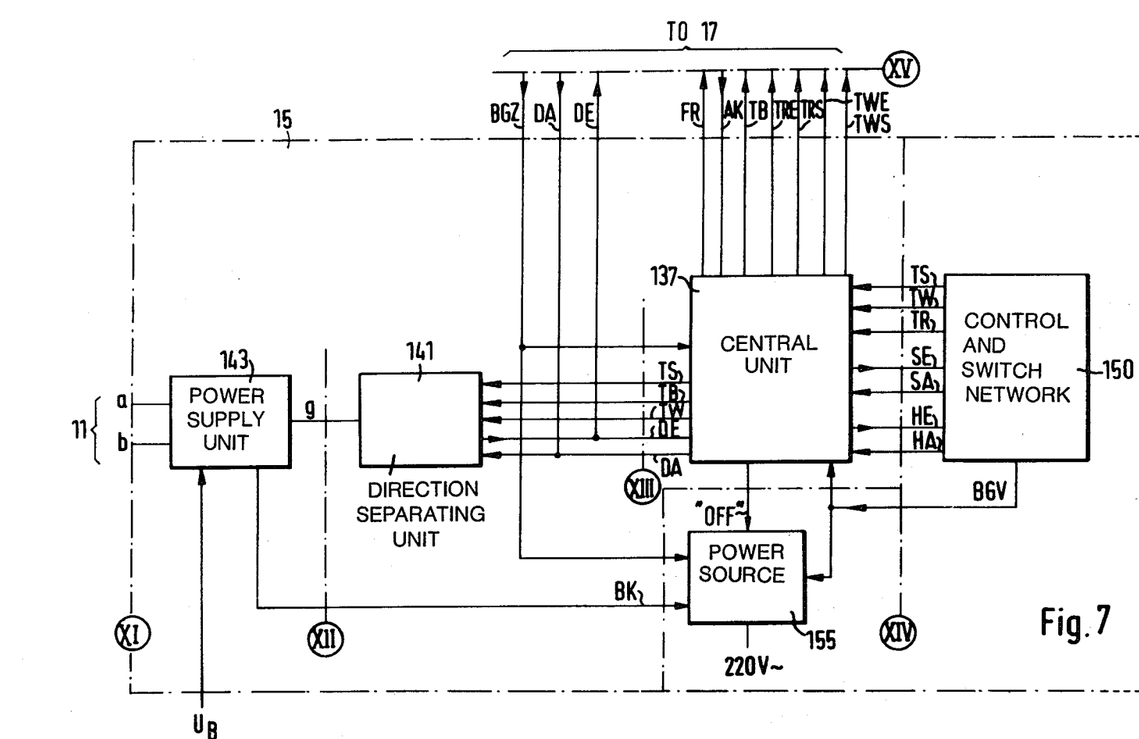
FIG. 7 shows the line circuit of FIG. 6 with the individual data and control lines.

The subscriber line circuit 15, shown in FIGS. 6 and 7 and also referred to as "line circuit", is the subscriber-assigned link between the subscriber's station, i.e. subscriber terminal equipment 1, the subscriber line 11, the other equipment of the exchange—such as control, switching network, etc. (not shown in the drawing)—and the additional service facility 17. The individual units, which are similar in design and operation to the corresponding units of the terminal equipment 1, are designated by corresponding reference characters supplemented by a hundreds digit. These are essentially a central unit 137, a direction-separating unit 141, and a power supply unit 143, which are interconnected by a serial data bus 139, control lines 147, on/off lines 149, and priority lines 151 (see FIG. 6).

The basic line circuit 15 is designed so that it can be connected to the exchange and the additional service facility 17 via a very small number of connectors. This simplification is achieved, among other things, by the use of the exchange clock as the reference or system clock, and of the serial 10-bit data bus.

The power supply unit 143 may be designed for a two-wire circuit (shown in the drawing) or a four-wire circuit. It contains transformers for coupling the supply current into the subscriber line 11, the current being coupled into the a- and b-wires in the former case, and into the c-, d-, e-, and f-wires in the latter case.

Here, too, the power supply unit is provided with a seizure detection circuit in the form of a bit-stream detector (in the case of four-wire operation only in the incoming direction), which responds when the subscriber line is seized. The seize condition is indicated via a control line.

The current coupled into the wires of the subscriber line 11 is maintained at a given constant value by a series regulator. The bit-stream detector, monitoring the state of the subscriber line 11 and connected in parallel with the transmission path, is of the same design as the bit-stream detector of the power supply unit 41 at the subscriber'end. It consists of a receiver with a high-impedance input and a response threshold. A detected seize condition is indicated via an interface line BK (FIG. 7).

The coupling transformer provides the necessary potential separation and signal level adaptation between the line circuit 15 and the subscriber line 11. Within the line circuit 15, the transmission path is unbalanced (cf. interface line g in FIG. 7).

The line circuit 15 and all following devices are protected against any overvoltages on the subscriber line 11 by protective devices in the power supply unit 143.

The power supply unit for a four-wire circuit differs from that just described in that two coupling transformers are used to couple the current into the c-, d-wires and the e-, f-wires, respectively, and that the bit-stream detector monitors the bit stream on the e- and f-wires.

The direction-separating unit 141 corresponds to that of the terminal equipment 1. It may be designed either for a two-wire circuit, in which case it contains a separating device operating in time-division multiplex, two-frequency duplex, or single-frequency duplex mode, or for a four-wire circuit.

The direction-separating unit 141 contains line drivers and receivers. It also carries out the line coding. The outgoing bit-rate clock required therefor is derived from the exchange clock (so-called master clock) and is also available to the central unit 137.

The unit 141 differs from the direction-separating unit 41 at the subscriber's end only in that the line coder is off in the rest condition and can be turned on from the seizure detector in the power supply unit 143, from the exchange, or from the additional service facility 17. To this end, three interface lines BK, BGV, and BGZ are provided which run to a power source to be described below (FIG. 7). To prevent the propagation time delay on the subscriber line 11 from influencing the clock assignment, phase compensation is performed in the steady state.

Since, as mentioned above, the central unit 137 is clocked by the exchange, the exchange side of the digital subscriber loop operates in the master mode, while the subscriber side operates in the slave mode. By a block 150, constituents of the exchange—such as the control and the switching network—are indicated which are supplied with the system clock via a control line TS (FIG. 6).

The central unit 137 contains devices for producing the synchronizing pattern, detecting the synchronization, and multiplexing to insert information from the main and additional channels into the 10-bit data bus or extracting it therefrom. The main channel is permanently assigned to the switching equipment, while the additional channel for data is permanently assigned to the additional service facility 17. The additional channel for signalling in the incoming direction, ZKS, is routed in the direction of the telephone exchange or in the direction of the additional service facility 17, depending on the header of a signalling word. The data flow is thus controlled in an unambiguous manner. At the interface XII to the direction-separating unit 141, the 10-bit channel is transmitted. At the interface XIV to the exchange 150, only the main channel and the signalling assigned thereto are transmitted, and at the interface XV to the additional service facility, the connection is again provided by the 10-bit bus. The interfaces XIV and XV are operated at the system clock rate of 2,048 kHz.

For the signalling in the outgoing direction, the central unit 137 also controls the priority between the exchange 150 and the additional service facility 17, always in favour of telephone communication. The central unit 137 controls all time sequences between the data bus 139 (interface XIII), the exchange (interface XIV), and the additional service facility (interface XV).

The system clock, the word-rate clock, and the frame rate clock are available on the lines TS, TW, and TR of the interface XIV. The bit-rate clock (80 kHz) and all write and read clocks necessary for multiplexing and time-slot rearrangement are derived from these clocks. Bit, word, and frame periods begin at the same time.

The synchronizing pattern is produced in the central unit 137 by gating the synchronizing word into the ninth bit of the first 8 word periods of each frame period of the outgoing data stream DA. In the opposite direction, the synchronizing word sent back by the subscriber terminal equipment 1 is selected from every ninth bit of the incoming data DE.

A bit pattern supporting the synchronization is gated into the other bits of the outgoing data stream, which are not used for the synchronizing word. The gating is interrupted as soon as synchronization is achieved. During the seizure phase, the incoming data stream DA, too, is provided with a pattern supporting the synchronization. This pattern is evaluated and used to speed up the synchronization. Synchronization is considered to have been achieved if the synchronizing word has been detected twice in succession. If the synchronizing word is not detected twice in succession, the synchronization will be initiated anew.

After the detection of synchronism, a request-to-seize signal, together with the code for "telephone communication" in the header of a signalling word, is gated into the information field of a frame period of the outgoing data stream.

The main channel on the interface line DE of the data bus 139 is assigned to the 8-bit channel of the exchange 150 on the interface line HE. Conversely, the 8-bit channel of the exchange 150 on the interface line HA is permanently assigned to the main channel within the 10-bit channel on the interface line DA. The logic states of the first 8 bits of each word period in the 10-bit channel are transferred into the first 8 bits of a corresponding word period of the 8-bit channel, and vice versa. The central unit 137 contains the memories necessary for this transfer.

If the code for "telephone communication" is detected on the interface line DE in the header of a frame period, the logic states of the 8 bits of the information field are transferred into the second to ninth bits of an associated frame period of the signalling channel on the interface line SE, the signalling condition (logic 1) being indicated in the first bit. If the header for "telephone communication" is not detected, the logic states of the 16 bits of the header and the information field are transferred into the second to seventeenth bits of an associated frame period of the data channel DE of the additional service facility 17.

In the outgoing direction, the signalling channel is used either by the exchange 150 or by the additional service facility 17, according to priority.

If a logic 1 state is detected on the interface line SA in the first bit of a frame period, the states of the second to ninth bits, together with the code for "telephone communication" in the header are gated into the information field of a frame period in the 10-bit channel on the interface line DA. Otherwise the states of the second to seventeenth bits of the data channel on the interface line DA of the interface XV are transferred into the header and the information field.

The additional data channel in the 10-bit channel on the interface line DE is permanently assigned to the data channel of the additional service facility at the interface XV. Conversely, the data channel of the additional service facility on the line DA of the interface XV is permanently assigned to the additional data channel in the 10bit channel on the interface line DA. The logic state of the tenth bit of each word period of the 10-bit channel is transferred into the first bit of a corresponding word period of the data channel of the additional service facility, and vice versa.

During signalling in the 10-bit channel, parity checks with acknowledgement are performed. If more stringent requirements are imposed on signal protection, an error detecting code can be gated into the check field of each frame period of the outgoing data stream. This code is then checked and acknowledged at the receiving end.

As soon as a logic 1 state is detected in the first bit of a frame period on the line SA of the interface XIV, the line FR at the interface XV is deactivated until the signal made available has been gated into the 10-bit channel. If the interface line AK is active, the signal transmission will be correspondingly delayed. This ensures that the transmission of a signal already started by the additional service facility 17 will be completed. The interface line FR can be activated only in the synchronous condition.

At the interface XV, besides the line TB for the bit-rate clock, line TRE and TRS for the frame-rate clock in the receive and transmit directions, respectively, and lines TWE and TWS for the word-rate clock in the receive and transmit directions, respectively, are present.

The subscriber terminal equipment is supplied with power from a central constant current source 155, which can be turned on and off via lines BK, BGZ, and "aus". The constant current provided by it is coupled into the subscriber line 11 in the power supply unit 143.

Details of the additional facility of the subscriber terminal equipment 1 are apparent from FIG. 8. There are two different types of additional facilities: additional facilities 3, 3A for data transmission over the main channel, and additional facilities 7, 7A for data transmission over the additional channel (see also FIG. 1). The additional facilities 3, 3A are mainly data transmission facilities with V or X interfaces as specified by CCITT. By contrast, the additional facilities 7, 7A may be various types, such as viewdata, teletypewriter or telefax equipment.

The additional facilities 3, 3A, 7, and 7A are connected to the terminal equipment 1 via interface devices 157, 159, 161, and 163, respectively. As mentioned above, the interface contains the data bus 39, the control lines 47, the lines 49 for turning the terminal equipment 1 on and off, and the lines 51 for controlling priority.

For signalling in the outgoing direction, the terminal equipment 1 has priority. If more than one additional facility 3, 3A or 7, 7A are present, the priority between the respective additional facilities is controlled over the line 165 or 167, respectively.

The interfaces 161 and 163 for data transmission over the additional channel contain devices for gating seize and clear signals into and out of the 10-bit data bus in the outgoing and incoming directions. In case of outgoing seizure, the power supply unit 43 in the terminal equipment 1 is turned on. In addition, there are provided devices for gating into and out of the data bus 39, so that the additional channel for data is available as a transparent 8-kbit/s channel, including the clock.

The write and read clocks necessary for the gating are derived from the bit-rate clock, the frame-rate clock, and the word-rate clock.

The devices 169 and 171, through which the interface devices 161 and 163, respectively, access the interface lines 39, 47, 49, and 51, are indicated in the drawing by broken lines. The same applies to the access devices 173 and 175 of the interface circuits 157 and 159, respectively.

If the signal transmission must be delayed in order to ensure that the terminal equipment 1 has priority, suitable buffer memories are provided. The interface circuits 161, 163 also contain devices (code converters, memories, etc.) for matching the data channel of the respective additional facility to the additional data channel available in transparent form from the general portions of the interface devices. In addition, the final adaptation to the respective type of seizure used in the additional facility 7, 7A takes place in these devices.

The interface circuits 157, 159 for data transmission over the main channel contain devices (code converters, memories, etc.) for matching the data channel of the additional facility to the 10-bit data bus. The write and read clocks necessary therefor are derived from the bit-rate clock and the word-rate clock.

Upon seizure of the main channel HKA by data services via the additional facility 3, the codec in the conversion unit 35 of the terminal equipment 1 is turned off via the respective interface circuit. The additional facility is released only if synchronism exists.

Figure 9:
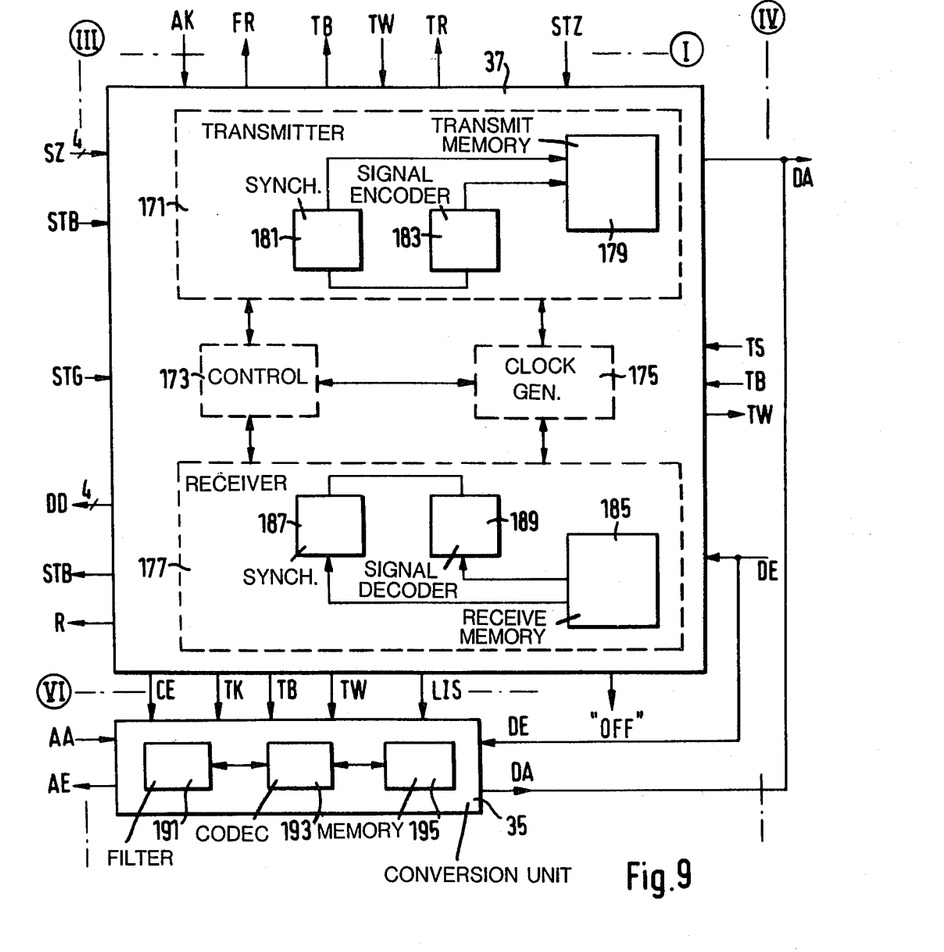
FIG. 9 shows the central unit and the conversion unit of the terminal equipment of FIGS. 4 and 5.

The design of the central unit 37 and the conversion unit 35 of the subscriber terminal equipment 1 is apparent from FIG. 9. The central unit 37 contains essentially a transmitter 171, a control 173, a clock generator 175, and a receiver 177, which are interconnected by suitable lines. The transmitter 171 contains a transmit memory 179, a synchronizing circuit 181, and a signal encoder 183. The receiver 177 contains a receive memory 185, a synchronizing circuit 187, and a signal decoder 189.

The interface lines connecting the central unit to the other units of the terminal equipment 1 correspond to the interface lines of FIG. 5, as is indicated by the dash-dotted interfaces I, III, IV, and VI. At the interface VI between the central unit 37 and the conversion unit 35, the lines L and S for transmitting read and write pulses, respectively, are combined into a common line LIS.

Via the interface I the central unit 37 can be connected to the additional facilities 3 and 7 and to the add-on equipment 53. Via the interface III, the central unit 37 is connected to the telephone set 2, and via the interface IV, it is connected to the direction-separating unit 41. A line labelled "aus" serves to turn the power supply unit 43 off.

The conversion unit 35 contains a speech-band-limiting filter 191, a codec 193 performing D/A and A/D conversion, and a memory 195, in which the digitized outgoing and incoming speech signals are temporarily stored.

Figure 10:
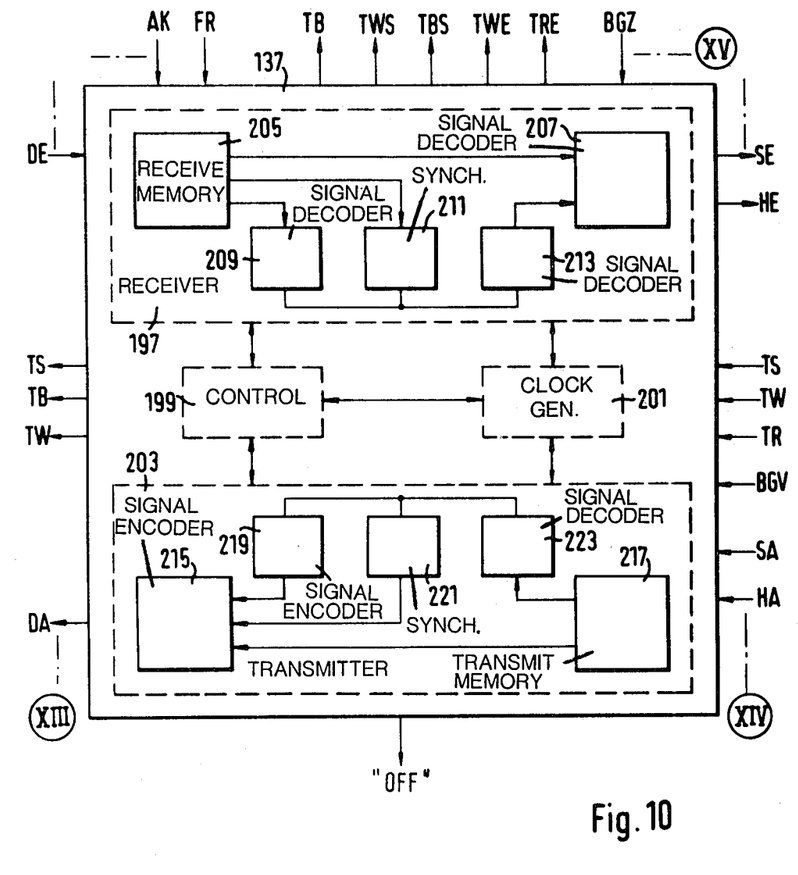
FIG. 10 shows the central unit of the line circuit of FIGS. 6 and 7.

FIG. 10 shows the design of the central unit 137 of the subscriber line circuit 15 at the exchange. It contains a receiver 197, a control 199, a clock generator 201, and a transmitter 203, which are interconnected by suitable lines. The receiver 197 contains a receive memory 205, a transmit memory 207, a signal decoder 207, a synchronizing circuit 211, and a signal decoder 213.

The transmitter 203 contains a transmit memory 207, a receive memory 217, a signal encoder 219, a synchronizing circuit 221, and a signal decoder 223.

The interface lines connecting the central unit 137 to the other units of the line circuit 15 are the same as those in FIG. 7, and were already explained there in part. This is also indicated by the dash-dotted interfaces XIII, XIV, and XV. Via the interface XIII the central unit 137 is connected to the direction-separating unit 141. Via the interface XIV it is connected to the exchange 150, and via the interface XV it can be connected to the additional service facility 17, which establishes the connection between the main channel—in case of data transmission—or the additional data channel and the various data networks or, e.g., the viewdata center. A line labelled "aus" serves to turn the power source 155 off.

The lines provided at the interfaces XI to XV of FIGS. 7 and 10 will now be explained in perspective.

The interface XI contains the a- and b-wires of the balanced subscriber line 11. In the case of a balanced four-wire line, the c-, d-, e-, and f-wires are present there.

At the interface XII, in the case of a two-wire circuit, there are provided an unbalanced line g for transmission in the line code, in the case of a four-wire circuit, an unbalanced line for incoming data in the line code, and an unbalanced line for outgoing data in the line code are provided. In addition, there are a line BK for incoming seizure, and a line for the constant-current supply.

At the interface XIII the following lines are present: TS for the system clock, TB for the bit-rate clock, TW for the word-rate clock, DE for incoming binary-coded data, and DA for outgoing binary-coded data. The interface XIV contains the following lines: TS, TW, and TR for the system, word-rate, and frame-rate clocks, respectively, SE for incoming signalling information, SA for outgoing signalling information, HE for incoming main channel, HA for outgoing main channel, and BGV for seizure from the exchange 150.

At the interface XV the following lines are provided: BGZ for seizure from the additional service facility 17, DA for outgoing binary-coded data, DE for incoming binary-coded data, FR for release (for signalling from additional service facility), AK for activating (for signalling from the additional service facility), TB for the bit-rate clock, TWS for the word-rate clock in the transmit direction, TBS for the bit-rate clock in the receive direction, TWE for the word-rate clock in the receive direction, TRS for the frame-rate clock in the transmit direction, and TRE for the frame-rate clock in the receive direction.

Both the central unit 37 and the central unit 137 are designed as pure hardware circuits which can be built with commercially available active and passive components and are advantageously implemented using integrated circuit techniques.

The additional data channel ZKD (see FIG. 1) can be used either for the transmission of one data service (e.g., viewdata, teletex or telefax) at a time, it being possible, however, to transmit different services at different times, or to establish connections for the different services at the same time, in which case a fixed subframe is assigned to the individual services.

In the signalling and synchronizing channel ZKS, in addition to the signalling information for the main channel HKA and the additional data channel ZKD, signals can be exchanged between a subscriber and a central facility, such as an alarm center.

The channel allocation for the transmission of information may also be as follows: a 64-kbit/s main channel, a 2-kbit/s synchronizing channel, and a 14-kbit/s additional data and signalling channel, the additional data and the signalling data being transmitted as information packets on an equal priority basis and, if necessary, for several services simultaneously.

The division of the terminal equipment 1 and the line circuit 15 into several functional units and the clearly defined interfaces permit a modular construction of the communication system according to the invention. In particular, the system can be adapted to different direction-separating techniques by replacing the direction-separating unit 41 or 141, which is arranged on a printed-circuit board. The separation of the basic terminal equipment 1 from the luxury equipment 53, the additional facility 3 for data transmission over the main channel, and the additional facility 7 for data transmission over the additional channel, which can be connected via the interface 1 (FIGS. 5 and 6) using simple connectors, permits the basic telephone set to be remotely supplied via the exchange line. By contrast, the additional facilities and the luxury equipment are supplied locally.

For a transition period which will probably continue for some time, the all-digital telephone network aimed at will not yet be present, so that digital subscriber loops may have to be operated in conjunction with analog local exchanges. In such cases, a suitable matching device, which provides, among other things, D/A and A/D conversion and signalling adaptation, must be inserted between the respective line circuit 15 and the analog exchange.

We claim:

1. A digital communications system comprising an exchange interconnecting a plurality of subscriber terminals, said exchange including a plurality of line circuits with each line circuit being connected to a separate one of said terminals over a bidirectional digital subscriber line, each line circuit and each terminal including a central unit, each terminal including a main source of digital data and certain of said terminals including an auxiliary source of data; a multiplex data bus in each terminal interconnecting said central unit, said main digital data source, the auxiliary data source with said bidirectional subscriber line; and means in said central unit of a terminal for directing digital data from each data word received from the line to said main source of digital data within the terminal for directing further data from each word to the auxiliary source within the terminal and for utilizing still further digital data from each word for signalling and for synchronizing said data bus.

2. A digital communications system as claimed in claim 1, in which there is means in the central unit in each terminal for combining digital data from the main source with digital data from the auxiliary source and with signal data generated internally in said central unit into a data word for transmission over said data bus to said line.

3. A digital communications system as claimed in claim 2, in which the central unit of each terminal includes digital transmitting means and digital receiving means, each including memory, encoding means and synchronizing means.

4. A digital communications system as claimed in claim 1, in which each line circuit includes a bidirectional data bus for the transmission of digital data from a subscriber line to the central unit for further transmission and for the transmission of digital data from said central unit to a subscriber line.

5. A digital communications system as claimed in claim 4, in which said line circuit central unit includes transmit means and receive means both for digital data and in which both said transmit and receive means comprise data memory, decoding means and a synchronizing circuit.

* * * * *